April 3, 1956 H. P. JOHNSON 2,740,380
TAIL SLING
Filed Sept. 2, 1953
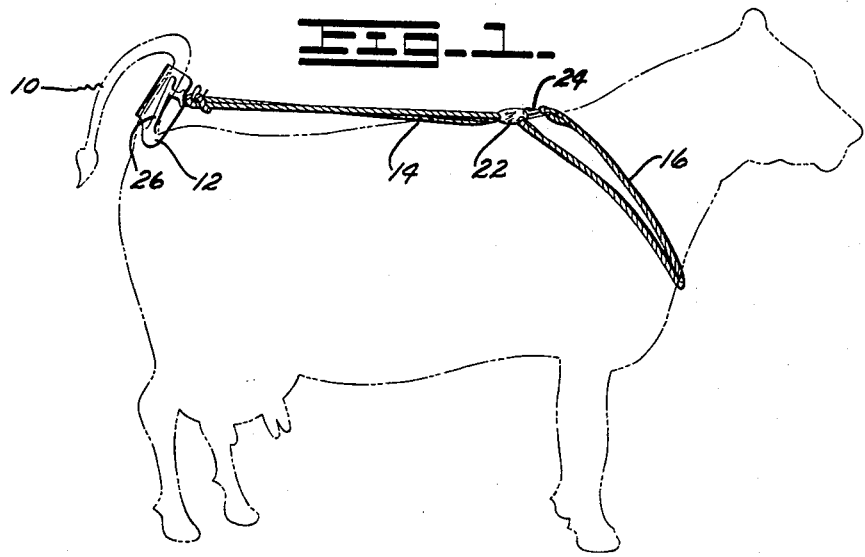
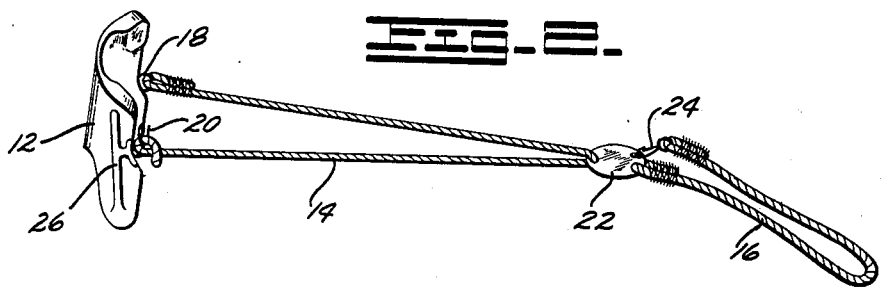
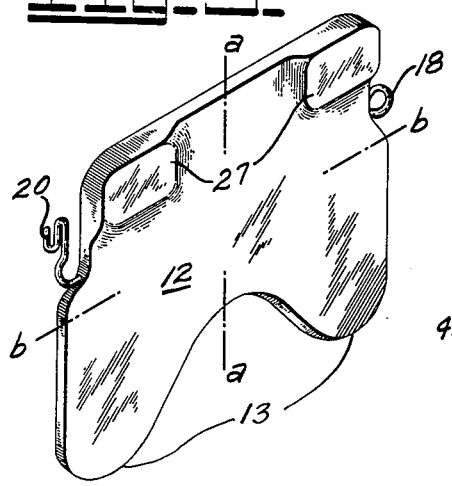
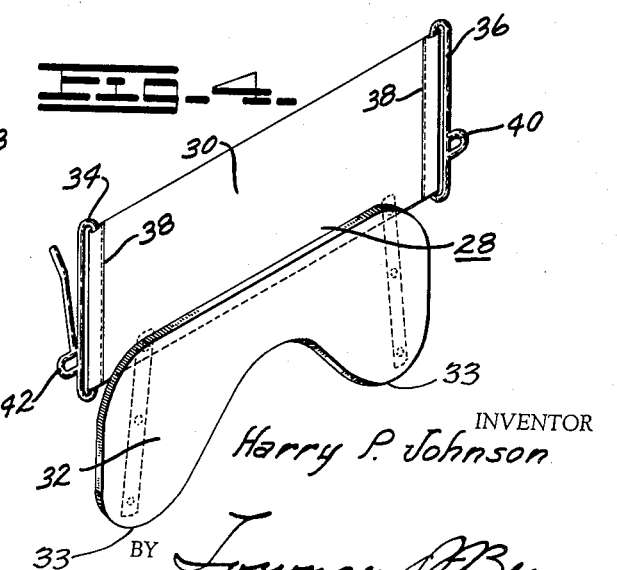
INVENTOR
Harry P. Johnson
BY Townsen P. Beaman
ATTORNEY

United States Patent Office

2,740,380
Patented Apr. 3, 1956

2,740,380

TAIL SLING

Harry P. Johnson, Eaton Rapids, Mich.

Application September 2, 1953, Serial No. 378,018

4 Claims. (Cl. 119—105)

The present invention relates to improvements in method and apparatus for animal restraint being particularly designed for cattle and involving method and apparatus for effecting a partial paralysis of the hind legs by forcing and maintaining the tail in a dorsal forward position during the period of restraint.

Many proposals appear in the patented art for the restraint of cattle against kicking. A few of such proposals have appeared upon the market but those which have gone into use have many disadvantages including the difficulty of application, the possibility of injury to the animal and a tendency to produce extreme nervousness in the animal which is especially undesirable with milch cows.

The present invention which may be characterized as a tail sling has been found of great assistance (1) to the dairyman in the milking of heifers and cows with injured teats, (2) to the veterinarian in connection with minor teat surgery, administration af anesthesia for ruminotomy, catherizing and removal of retained placenta, and (3) to the inseminator in restraint for the depositing of semen.

The theoretical principle of the present invention is considered to consist of the manipulation of the animal's tail in such a manner as to cause a temporary paralysis of the hind legs due to the forcing out of position the nerves of the sympathetic trunk and/or the ventral-lateral coccygeal nerve.

One form of apparatus for carrying out the principle of my improved method of restraint takes the form of a tail embracing member having a relatively stiff lower portion for the purpose of inhibiting the tail from tipping laterally when forced in a dorsal forward position; the stiff portion of the tail sling giving support to the fourth, fifth and part of the sixth coccygeal vertebra.

The lower edge of the base portion of the tail sling rests laterally to the tailhead and medially to the tuber ischii. The relative rigid base portion of the tail sling may be continued upwardly to form the tail-grasping top portion of the sling or the top portion may be of more pliable material, the top portion of the sling grasping the tail in relation to the sixth and seventh coccygeal vertebra.

Thus, an object of the invention is to provide an improved method of animal restraint through tail support and manipulation.

Another object is to provide apparatus for carrying out the improved method of restraint.

A further object is to provide a tail sling especially designed for cattle in which support and tension is given to the tail producing partial paralysis of the hind legs of the animal in a humane manner substantially free of all possibility of injury to the animal.

A still further object of the invention is to provide a tail sling having a base portion for inhibiting a lateral tipping of the tail and giving support to the third and fourth coccygeal vertebra which rests laterally to the tailhead and medially to the tuber ischii of the pelvis.

The upper portion of the tail sling grasping the tail at the sixth and seventh coccygeal vertebra with tension structure for forcing the tail, while grasped in the sling, into a dorsal forward position.

These and other objects and advantages of the present invention will more fully appear from the following specification and the appended claims.

In the drawings,

Fig. 1 shows the restraint apparatus applied to a milch cow,

Fig. 2 shows the apparatus of Fig. 1 removed from the cow but with the parts shown in their position of tension upon the cow, Fig. 3 shows one form of the tail embracing member of the tail sling apparatus, and Fig. 4 is a view similar to Fig. 3 of another form of the tail embracing member.

As shown in Fig. 1, the tail 10 of the milch cow is forced into a dorsal forward position by the tail sling apparatus which comprises a tail embracing member 12 tensioned forwardly by a flexible take-up member 14 running through an eye of the halter 16 constituting an anchorage and disposed about the cow's neck. Preferably, the member 14 is in the form of a rope fixedly attached at one end to the eye 18 of the member 12 with the other end of the rope adjustably attached to the hook 20. The halter 16 may likewise be of rope with one end fixedly attached to the eye plate 22 and the other end of the rope having a snap 24 engageable into an opening in the plate 22.

To apply the tail sling apparatus shown in Fig. 1, the halter is first attached around the neck of the animal. Then the rope 14 is passed through the eye of the plate 22. With the operator standing at the side and adjacent the rear of the animal, the tail embracing member 12 is placed beneath the tail and the tail is then elevated with the member 12 being bent about the axis a—a of Fig. 3 by the palm and fingers of one hand. At the same time the rope 14 is drawn up to tension the member 12 about the tail 10 forcing it into a forward dorsal position.

The tail embracing member 12 may be of relatively heavy molded rubber material which, in its unstressed state, may be disposed in a plane as shown in Fig. 3. Although relatively stiff, the member 12 may be deflected about the axis a—a as shown in Fig. 3 to wrap around the under side of the tail 10. Stiffening members 26 are preferably embedded in the member 12 to prevent deflection thereof about the axis b—b and thus preventing tipping of the tail 10 laterally when forced into a dorsal forward position.

The lower portion of the member 12 gives support to the fourth and fifth and part of the sixth coccygeal vertebra with the base of the lower portion including spaced projections 13 disposed laterally to the tailhead and medially to the tuber ischii of the pelvis.

The upper portion of the member 12 is provided with thickened pad portions 27 on the inside thereof. When the member 12 is folded upon the tail 10, the pad portions 27 provide a restriction at the upper part of the member 12 in its folded condition to retain the tail 10 within the fold of the member 12.

In the form of the invention shown in Fig. 4, the upper portion of the tail embracing member 28 is of pliable woven webbing 30 stitched to the upper edge of relatively stiff leather lower portion 32 having spaced projections 33. At opposite ends of the webbing 30 wire loops 34 and 36 embraced within the hems 38 have rope receiving members 40 and 42 corresponding to the parts 18 and 20 of Fig. 3. The function of the member 28 is similar to the member 12.

I claim:

1. An animal restraining device comprising the combination of a tail sling and a flexible tensioning means for attachment to an animal's neck having a pair of terminal portions, said tail sling comprising a sheet of flexible material of substantially rectangular formation, means on two opposite edge portions thereof having operative association with said terminal portions, and said tail sling being provided on a third edge portion with a pair of spaced projections, whereby when said tail sling is applied to an animal's tail and the latter brought into vertical position, said spaced projections will engage the body of the animal to hold said tail sling in operative position.

2. The invention of claim 1, in which said tail sling is substantially more flexible about an axis extending longitudinally of the tail than about any axis normal to the tail to conform said tail sling to the tail but at the same time support the tail against lateral tipping.

3. The invention of claim 1, in which said tail sling is provided with stiffening members disposed longitudinally of the tail on either side thereof so that said tail sling will be substantially more flexible about an axis disposed medially thereof and longitudinally of the tail than about any axis normal to the tail so that said tail sling will conform to the tail but at the same time support the tail against lateral tipping.

4. The invention of claim 1, in which said tail sling is provided with means disposed on the upper portion of said tail sling and on the inside thereof for providing a restriction for retaining the tail with said tail sling folded upon the tail.

References Cited in the file of this patent

UNITED STATES PATENTS

| | | |
|---|---|---|
| 569,812 | Cave | Oct. 20, 1896 |
| 1,047,808 | Hinkle et al. | Dec. 17, 1912 |
| 1,140,186 | Quick | May 18, 1915 |
| 1,859,213 | McCornack | May 17, 1932 |
| 2,050,356 | McCornack | Aug. 11, 1936 |
| 2,128,498 | Ottley | Aug. 30, 1938 |
| 2,286,258 | Bubenic | June 16, 1942 |